(12) United States Patent
Hills et al.

(10) Patent No.: US 7,303,446 B2
(45) Date of Patent: Dec. 4, 2007

(54) FRAME ASSEMBLY

(75) Inventors: Douglas P. Hills, Cedar Park, TX (US); Jerome A. Pratt, Round Rock, TX (US)

(73) Assignee: 3M Innovative Proprties Company, St. Paul, MN (US)

( * ) Notice: Subject to any disclaimer, the term of this patent is extended or adjusted under 35 U.S.C. 154(b) by 0 days.

(21) Appl. No.: 11/131,874

(22) Filed: May 18, 2005

(65) Prior Publication Data

US 2006/0264117 A1 Nov. 23, 2006

(51) Int. Cl.
*H01R 9/22* (2006.01)

(52) U.S. Cl. ...................................... 439/719; 439/715

(58) Field of Classification Search ................ 439/532, 439/709, 715, 719
See application file for complete search history.

(56) References Cited

U.S. PATENT DOCUMENTS

| | | | |
|---|---|---|---|
| 3,617,983 A | 11/1971 | Patton | |
| 3,702,456 A | 11/1972 | Patton | |
| 3,845,455 A | 10/1974 | Shoemaker | |
| 3,899,237 A | * 8/1975 | Briggs, Jr. | .................. 439/405 |
| 4,192,570 A | 3/1980 | Van Horn | |
| 4,494,813 A | 1/1985 | Daley, Jr. et al. | |
| 4,541,679 A | 9/1985 | Fiedler et al. | |
| 4,684,195 A | 8/1987 | Anderson et al. | |
| 4,795,363 A | 1/1989 | Scherer et al. | |
| 4,815,988 A | 3/1989 | Scherer | |
| 4,932,894 A | 6/1990 | Scherer | |
| 4,995,829 A | 2/1991 | Geib et al. | |
| 5,007,862 A | * 4/1991 | Defibaugh et al. | .......... 439/607 |
| 5,055,067 A | 10/1991 | Field | |
| 5,178,558 A | 1/1993 | Know et al. | |
| 5,199,899 A | 4/1993 | Ittah | |
| 5,208,737 A | 5/1993 | Miller | |
| 5,281,163 A | 1/1994 | Knox et al. | |
| 5,370,558 A | 12/1994 | Scherer et al. | |
| 5,435,747 A | 7/1995 | Franckx et al. | |
| 5,449,299 A | 9/1995 | Shimirak et al. | |
| 5,504,654 A | 4/1996 | Knox et al. | |
| 5,549,489 A | 8/1996 | Baggett et al. | |
| 5,575,689 A | 11/1996 | Baggett et al. | |
| 5,595,507 A | * 1/1997 | Braun et al. | ................. 439/716 |
| 5,627,721 A | * 5/1997 | Figueiredo et al. | ......... 361/119 |

(Continued)

FOREIGN PATENT DOCUMENTS

AU 199859515 B2 10/1998

(Continued)

OTHER PUBLICATIONS

U.S. Appl. No. 10/941,441; Xavier Fasce et al, filed Sep. 15, 2004, entitled "Connector Assembly for Housing Insulation Displacement Elements".

(Continued)

*Primary Examiner*—Thanh-Tam Le
(74) *Attorney, Agent, or Firm*—Janet A. Kling; John A. Burtis (57) ABSTRACT

A frame assembly for mounting an insulation displacement connector block includes a base frame and a modular subframe attached to the base frame. The subframe is capable of being attached to the base frame in a first position or a second position, which are generally perpendicular to each other.

15 Claims, 5 Drawing Sheets

U.S. PATENT DOCUMENTS

| | | | |
|---|---|---|---|
| 5,779,504 A * | 7/1998 | Dominiak et al. ............ 439/709 |
| 5,785,548 A | 7/1998 | Capper et al. |
| 5,797,759 A | 8/1998 | Mattis et al. |
| 5,836,791 A | 11/1998 | Waas et al. |
| 5,961,345 A | 10/1999 | Finn et al. |
| 5,967,826 A | 10/1999 | Letailleur |
| 5,989,062 A * | 11/1999 | Daoud ........................ 439/532 |
| 6,015,312 A | 1/2000 | Escane |
| 6,086,415 A * | 7/2000 | Sanchez et al. ........... 439/540.1 |
| 6,089,902 A | 7/2000 | Daoud |
| 6,099,343 A | 8/2000 | Bonvallat et al. |
| 6,152,760 A | 11/2000 | Reeser |
| 6,188,560 B1 | 2/2001 | Waas |
| 6,193,556 B1 | 2/2001 | Escane |
| 6,208,233 B1 | 3/2001 | Stein, Sr. et al. |
| 6,222,717 B1 | 4/2001 | Waas et al. |
| 6,582,247 B2 | 6/2003 | Siemon |
| 6,676,430 B1 | 1/2004 | Conorich |
| 6,811,430 B1 | 11/2004 | Carrico et al. |
| 2003/0156389 A1 | 8/2003 | Busse et al. |
| 2004/0219815 A1 | 11/2004 | Thompson et al. |

FOREIGN PATENT DOCUMENTS

| | | |
|---|---|---|
| DE | 33 13 654 A1 | 10/1984 |
| EP | 0 073 740 | 3/1983 |
| EP | 0 778 637 A2 | 6/1997 |
| GB | 2 129 628 | 5/1984 |
| GB | 2 129 630 A | 5/1984 |
| GB | 2 264 815 A | 9/1993 |
| WO | WO 99/04454 | 1/1999 |
| WO | WO 99/04455 | 1/1999 |
| WO | WO 02/075857 A1 | 9/2002 |

OTHER PUBLICATIONS

U.S. Appl. No. 10/941,506; Xavier Fasce et al, filed Sep. 15, 2004, entitled "Insulation Displacement System for Two Electrical Conductors".

U.S. Appl. No. 29/213,197; Xavier Fasce et al, filed Sep. 15, 2004, entitled "Cap for Electrical Connector".

U.S. Appl. No. 11/131,639, Dower et al, filed May 18, 2005, entitled Electrical Connector Assembly and Method of Forming the Same.

U.S. Appl. No. 11/170,956, Pratt, filed Jun. 30, 2005, entitled Apparatus Configured to Attach to an Electrical Connector Block.

U.S. Serial No. Unknown, Pratt, filed Aug. 3, 2005, entitled "Circuit Marker Apparatus".

Technical Report, "3M 4500 Modular Terminating System", Oct. 1993.

* cited by examiner

FRAME ASSEMBLY

FIELD

The present invention relates to an electrical connector assembly. More particularly, the present invention relates to a frame assembly for mounting an electrical connector block, such as an insulation displacement connector block ("connector block"), where the frame assembly includes a base frame and a modular subframe.

BACKGROUND

In a telecommunications context, electrical connector blocks are connected to cables that feed subscribers while other electrical connector blocks are connected to cables that are fed from a processing center. To make the electrical connection between the subscriber block and the processing center block, a jumper wire (e.g., an electrical conductor) may be inserted in the electrical connector block to complete the electrical circuit. Typically a jumper wire can be connected, disconnected, and reconnected several times as the consumer's needs change.

A connector block including an insulation displacement connector ("IDC") is a useful type of electrical connector because electrical connections may be made without having to strip an insulated conductor of its insulation. An IDC element within the connector block cuts through the insulation, thereby making an electrical connection with a conductive core of the conductor.

When a connector block is used in the telecommunications context, the connector block is typically mounted in a central location, such as a telecommunications closet, an outdoor cabinet, an aerial terminal or closure or other common use applications along with a plurality of other connector blocks. Specifically, the connector block is attached to a frame, and the frame is attached to the central location. A telecommunications worker may need to access the connector block in the central location in order to make the necessary electrical connections between subscriber blocks and processing center blocks, or between other devices.

BRIEF SUMMARY

In a first aspect, the present invention is a frame assembly for mounting an insulation displacement connector block. The frame assembly comprises a first base frame and a first subframe capable of receiving the insulation displacement connector block. The first subframe is attached to the first base frame. The first subframe is capable of being attached to the first base frame in a first position or a second position, where the first position and the second position are generally perpendicular to each other.

In a second aspect, the present invention is a frame assembly comprising a base frame and a first modular subframe attached to the base frame. The base frame includes a generally planar sidewall. The first modular subframe includes a first longitudinal edge, and is capable of receiving an insulation displacement connector block. The first subframe is capable of being attached to the base frame in a first position or a second position, where in the first position, the first longitudinal edge is generally parallel to the sidewall of the base frame, and in the second position, the first longitudinal edge is generally perpendicular to the sidewall of the base frame.

In a third aspect, the present invention is a frame assembly for mounting a plurality of insulation displacing connector blocks. The frame assembly comprises a base frame having a generally square inner perimeter, and a plurality of modular subframes attached to the inner perimeter of the base frame. The plurality of modular subframes are generally parallel to each other. Each modular subframe is detachable from the base frame, and each modular subframe is capable of receiving at least one of the plurality of insulation displacement connector blocks.

The above summary is not intended to describe each disclosed embodiment or every implementation of the present invention. The figures and the detailed description which follow more particularly exemplify illustrative embodiments.

BRIEF DESCRIPTION OF THE DRAWINGS

The present invention will be further explained with reference to the drawing figures listed below, where like structure is referenced by like numerals throughout the several views.

While the above-identified figures set forth exemplary embodiments of the present invention, other embodiments are also within the invention. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION

The present invention is a frame assembly for mounting a connector block, where the frame assembly includes a base frame and a subframe. The subframe, which is capable of receiving at least one connector block, is capable of attaching to the base frame in at least two positions. In the description of the present invention, two positions are described—a first position and a second position. In one embodiment, the first position and second position are generally perpendicular to each other. The dual positioning may enable the frame assembly to be used to mount the connector block so that its housings are aligned in a generally horizontal orientation (the first position) or aligned in a generally vertically stacked orientation (the second position). The generally horizontal and vertical orientations of a connector block are described in U.S. patent application Ser. No. 11/131,639, entitled, "ELECTRICAL CONNECTOR ASSEMBLY AND METHOD OF FORMING THE SAME," which was filed on the same date as the present application.

The frame assembly of the present invention may be used to mount a connector block in a central location. For example, the frame assembly may be attached to a frame panel in a telecommunications closet. The frame assembly is used to mount a plurality of connector blocks in the central location.

In one embodiment, the frame assembly includes a plurality of subframes. In this embodiment, the subframes used in the frame assembly of the present invention are modular. The modularity is two-fold. First, the subframes have standardized dimensions so that they are substantially similar in size. Second, the subframes may be flexibly arranged on the base frame. The subframes may be attached to the base frame in at least two positions. This will be discussed in reference to FIGS. 1-5 below.

The frame assembly of the present invention is versatile because each subframe may be individually detached and reattached to the base frame. As a result, a connector block, which is attached to a subframe, may be removed from the base frame and/or replaced.

A connector block may become damaged some time after it is mounted in a central location. Depending upon the needs of the particular telecommunications network, space within the central location may be at a premium. A damaged connector block may be an inefficient use of space, and it may be desirable to replace the damaged connector block with an undamaged one. In existing frame assemblies, it is difficult to replace a connector block that is mounted in the central location because the connector block may be permanently affixed to the frame. It is even more difficult to replace a single connector block at a time. In existing frame assemblies, the frame is typically a single piece. In order to replace a connector block (whether it is damaged or otherwise), the entire frame must be removed from the central location and replaced, thereby wasting the undamaged connector blocks that may also be attached to the replaced frame and requiring additional labor for disconnecting and reconnecting conductors to the undamaged connector blocks.

In the present invention, a connector block is not permanently affixed to the base frame because the connector block is attached to a subframe and the subframe may be detached from and reattached to the base frame, or a new subframe may replace a removed subframe. In alternate embodiments, the connector block may be permanently attached to the subframe, or it may also be detachable therefrom. If the connector block becomes damaged, the subframe, and thus the damaged connector block, may be removed from the base frame. A subframe having an undamaged connector block may then be attached to the base frame in the gap created by the removal of the damaged connector block and its respective subframe. If the damaged connector block is permanently attached to its subframe, a new subframe (and undamaged connector block) may be attached to the base frame; if the damaged connector block is not permanently attached to its subframe (the "old" subframe), the damaged connector block may be removed from the old subframe and an undamaged connector block may be attached to the old subframe, and the old subframe may be reattached to the base frame.

One or more subframes may be attached to the base frame. In this way, the base frame can be used to mount more than one connector block. Because the present invention allows a damaged connector block to be removed from the base frame, the entire base frame does not need to be replaced when there is a damaged connector block. Undamaged connector blocks that are also attached to the base frame may remain on the base frame. Of course, the entire base frame may be replaced if the need arises. The present invention provides an efficient means of mounting a connector block because the entire frame assembly does not have to be replaced if a single connector block is damaged.

Figure 1:
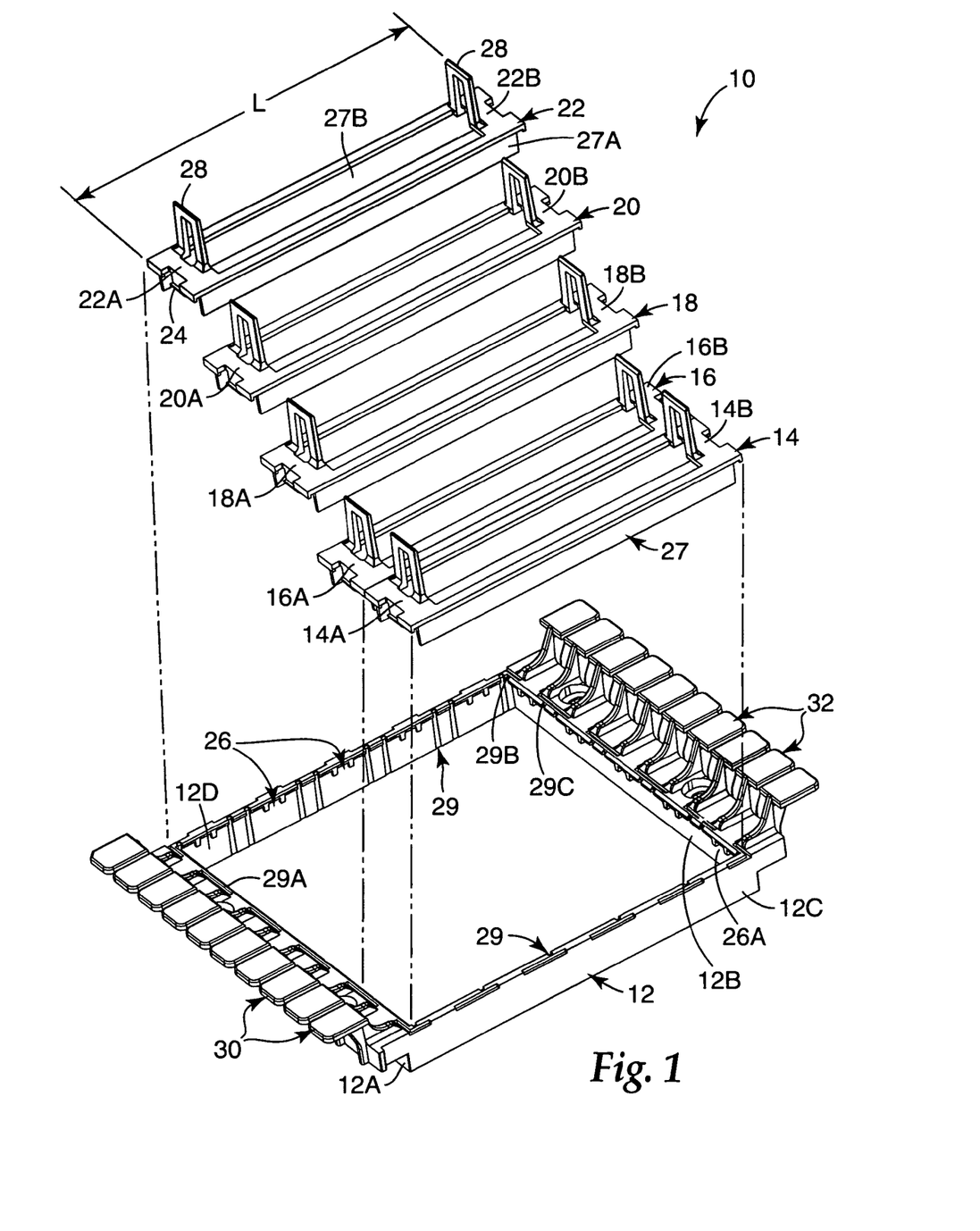
FIG. 1 is an exploded perspective view of an exemplary embodiment of a frame assembly in accordance with the present invention, where a plurality of subframes are shaped to attach to a base frame in a first position.
Figure 3A:
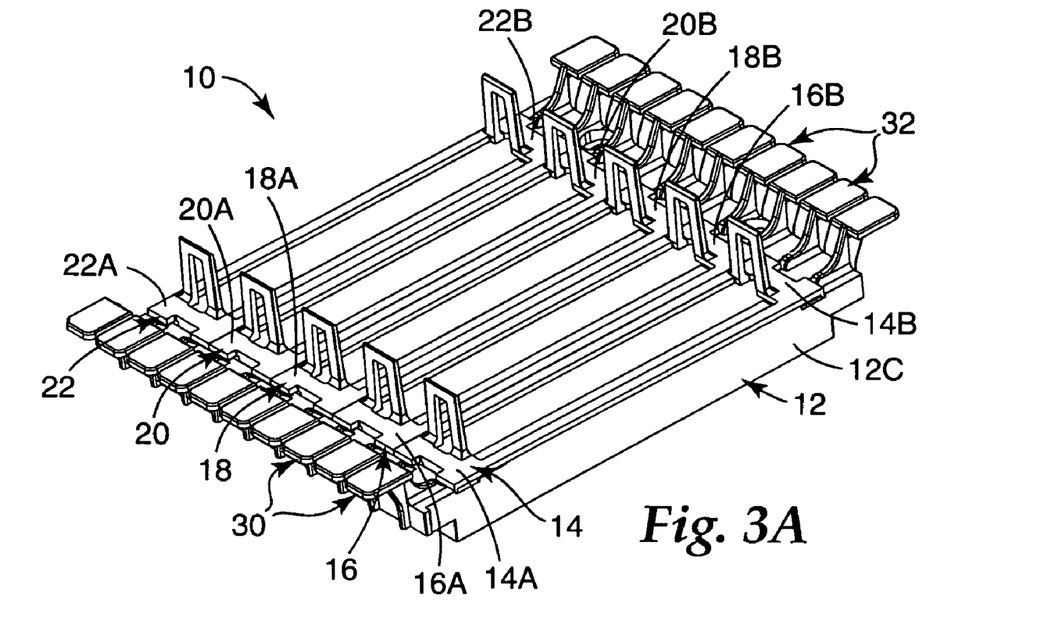
FIG. 3A is an assembled perspective view of the frame assembly of FIG. 1, where the subframes are attached to the base frame in the first position, such that the subframes are generally parallel to one another.
Figure 3B:
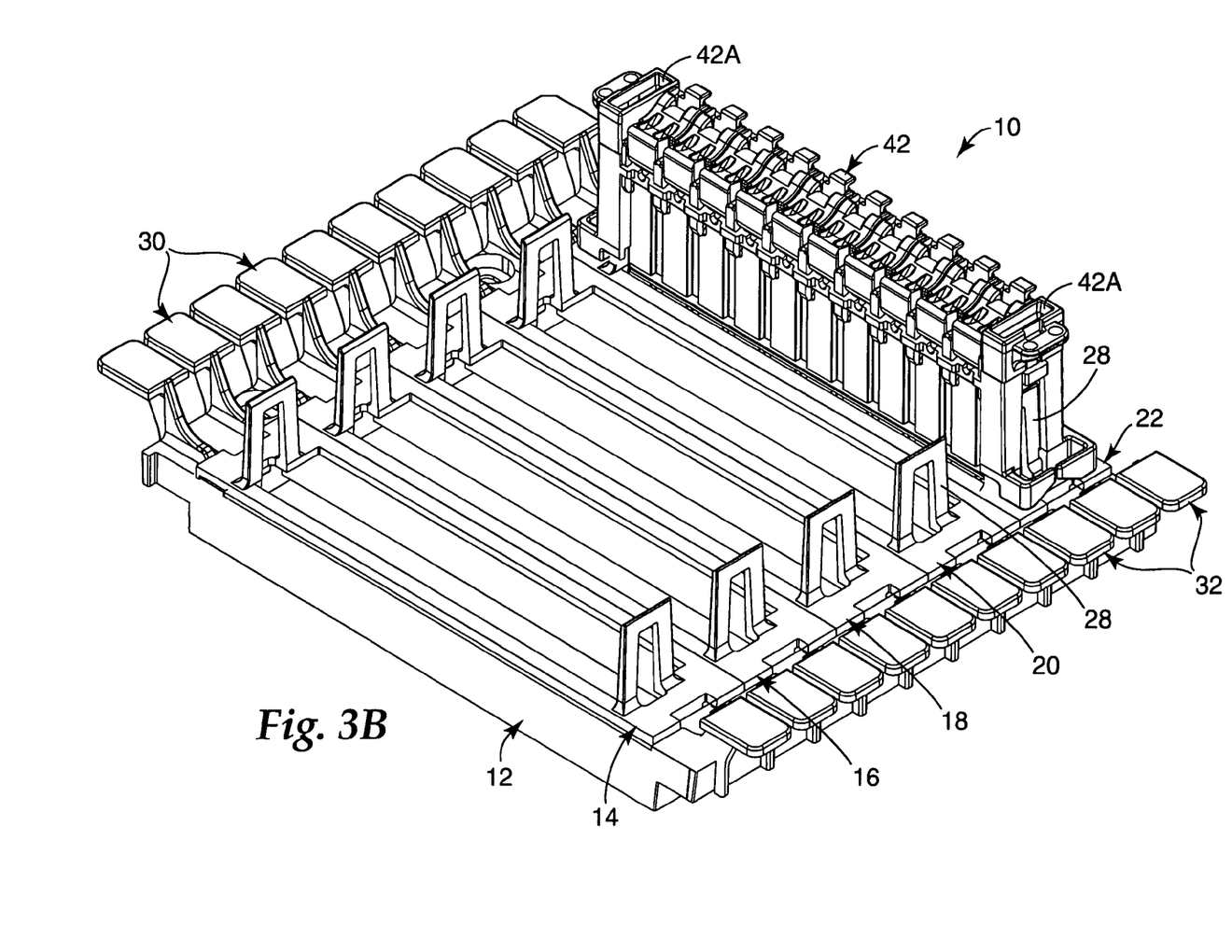
FIG. 3B is a perspective view of the assembled frame assembly of FIG. 1, where an electrical connector block is attached to one of the subframes.
Figure 4:
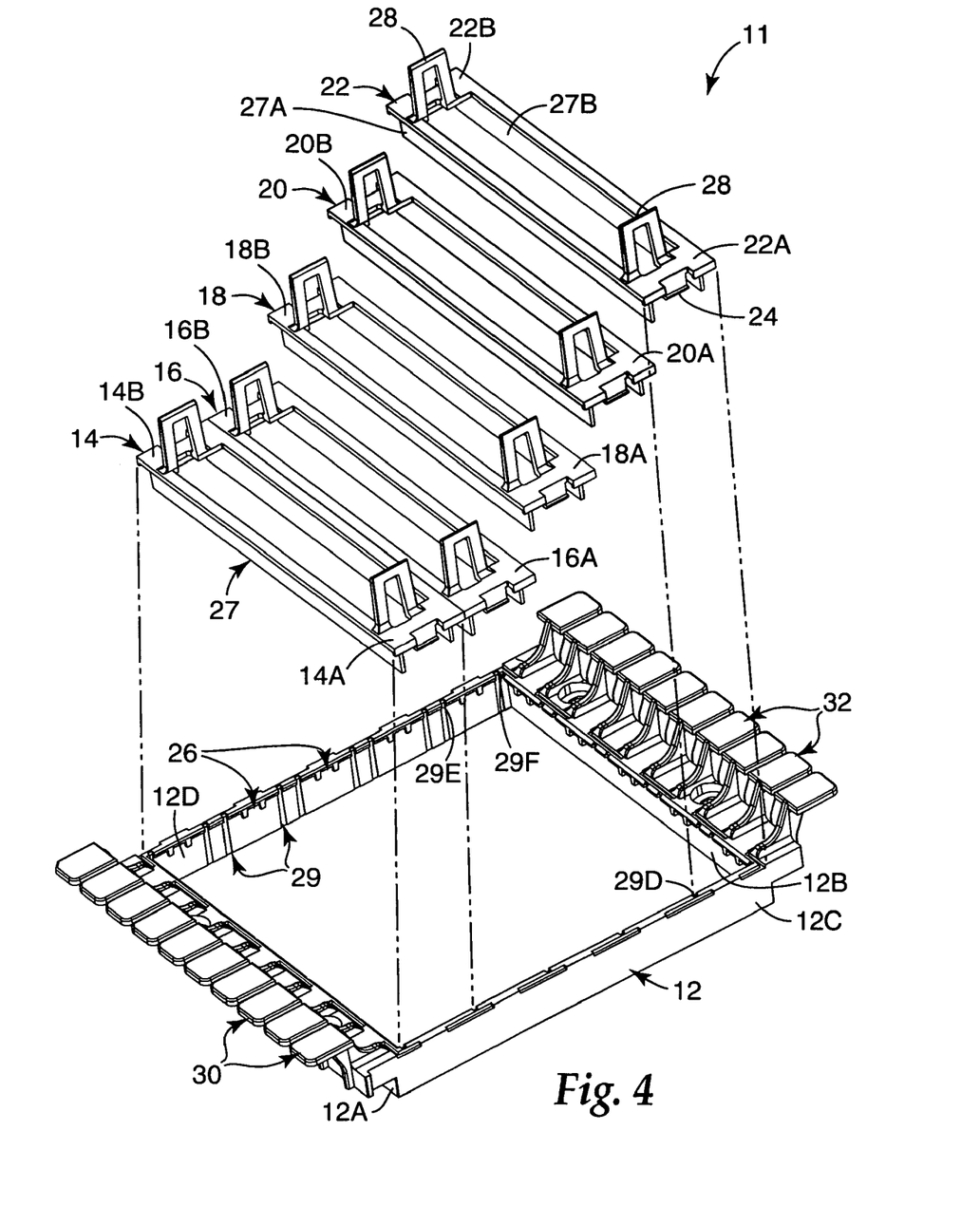
FIG. 4 is an exploded perspective view of the frame assembly of FIG. 1, where the subframes are attached to the base frame in a second position.
Figure 5:
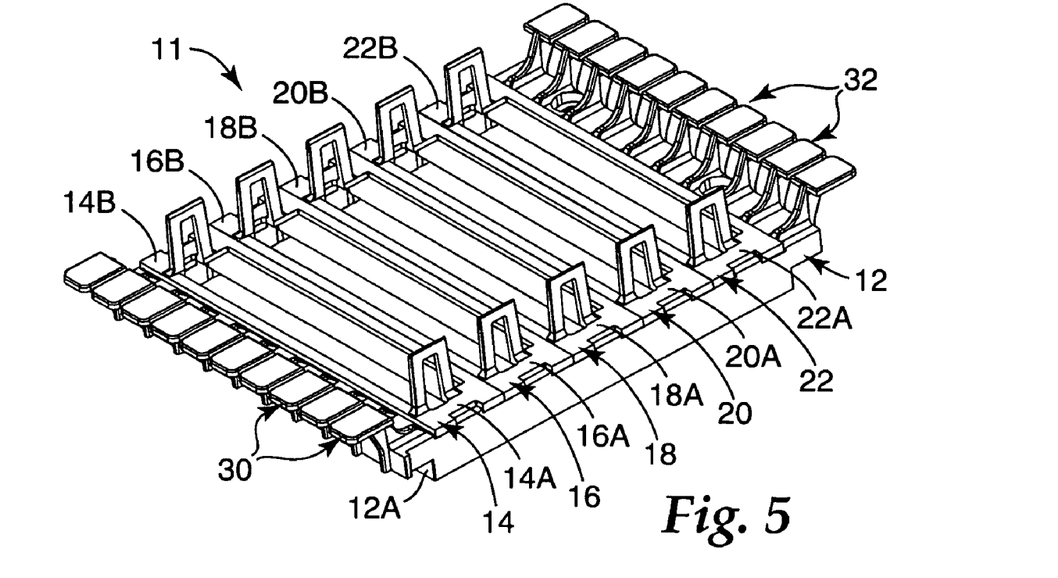
FIG. 5 is an assembled perspective view of the frame assembly of FIG. 4, where the subframes are attached to the base frame in the second position, such that the subframes are generally parallel to one another.

FIG. 1 is an exploded perspective view of an exemplary embodiment of frame assembly 10 of the present invention, which includes base frame 12 and modular subframes 14, 16, 18, 20, and 22. In FIGS. 1, 3A, and 3B, the subframes 14, 16, 18, 20, and 22, when assembled, attach to base frame 12 in a first position. A second position is described in reference to FIGS. 4 and 5. As discussed above, modular subframes 14, 16, 18, 20, and 22 of the present invention allow frame assembly 10 to have subframes 14, 16, 18, 20, and 22 arranged in at least two positions. These positions are described as a first position and a second position. The designation of the two positions in the exemplary embodiment as a "first" position and a "second" position are for clarity of description, and is not intended to limit the present invention in any way. Rather, the "first position" and "second position" designations below may also be swapped, so that the "first position" described in reference to FIG. 1 is called the "second position" and the "second position" described in reference to FIGS. 4 and 5 is called the "first position".

Subframes 14, 16, 18, 20, and 22 are each configured to receive a connector block (e.g., connector block 42 in FIG. 3B). Although the exemplary embodiment shows frame assembly 10 with five subframes 14, 16, 18, 20, and 22, a frame assembly in accordance with the present invention may have any suitable number of subframes. The features of each one of subframes 14 will be described in reference to subframe 22. However, in the exemplary embodiment, subframes 14, 16, 18, 20, and 22 are modular. That is, subframes 14, 16, 18, 20, and 22 have standardized dimensions so that they are substantially similar in size. Because of the modularity, the description of subframe 22 is representative of each subframe 14, 16, 18, 20, and 22.

Base frame 12 includes first sidewall 12A, second sidewall 12B, third sidewall 12C, and fourth sidewall 12D. First sidewall 12A is generally parallel to second sidewall 12B, and third sidewall 12C is generally parallel to fourth sidewall 12D. First and second sidewalls 12A and 12B are generally perpendicular to third and fourth sidewalls 12C and 12D. Preferably, sidewalls 12A, 12B, 12C, and 12D together form an inner perimeter of base frame 12, which preferably has a generally square shape.

The generally square shape allows the same number of subframes (such as give subframes 14, 16, 18, 20, and 22) to be attached to base frame 12 in two positions, where the two positions are generally perpendicular to each other. The two positions are illustrated in FIGS. 1, 3A, and 3B (first position), and FIGS. 4 and 5 (second position). In the first position, first end 14A of subframe 14 is adjacent first sidewall 12A of base frame 12, and second end 14B of subframe is adjacent second sidewall 12B of base frame 12; first end 16A of subframe 16 is adjacent first sidewall 12A of base frame 12, and second end 16B of subframe 16 is adjacent second sidewall 12B of base frame 12, and so forth with respect to subframes 18, 20, and 22. The second position will be described in reference to FIGS. 4 and 5.

Of course, if base frame 12 did not have a generally square inner perimeter, subframes 14, 16, 18, 20, and 22 may still be attached to base frame 12 in two generally perpendicular positions. For example, subframes 14, 16, 18, 20, and 22 may have an adjustable length, or a different number of subframes in the first position than in the second positions (e.g., 5 subframes in first position and 8 subframes in the second position). Taking subframe 22 as exemplary of subframes 14, 16, 18, and 20, a distance between first end 22A and second end 22B of subframe 22 may be adjustable so that the length L of subframe 22 may be varied, which may allow subframe 22 to extend from one sidewall to another for various distances between sidewalls.

In the embodiment shown in FIG. 1, subframe 22 attaches to base frame 12 using a latch mechanism. Projection 24 fits within a recess in base frame 12. The recess mechanically engages with projection 24 so that subframe 22 is securely attached to base frame 12. The recess that corresponds with projection 24 of first end 22A of subframe 22 is not in view in FIG. 1. However, similar-shaped recesses 26 are seen in FIG. 1. Each sidewall 12A, 12B, 12C, and 12D of base frame 12 has a plurality of recesses 26 about the inner perimeter of base frame 12. Each of the recesses 26 are configured to receive a projection (e.g., projection 24) of subframes 14, 16, 18, 20, and 22. In the exemplary embodiment of FIG. 1, two projections 24 are on opposite ends 22A and 22B of subframe 22, and each projection 24 fits within a separate recess in base frame 12. For each subframe, the two recesses that correspond to each projection 24 on the subframe are on opposite sidewalls of the base frame 12. For example, in the first position of subframe 22 in FIG. 1, a projection 24 on first end 22A of subframe 22 fits within recess (not shown in FIG. 1) on first sidewall 12A of base frame 12, and a projection 24 on second end 22B of subframe 22 fits within a recess 26A on second sidewall 12B of base frame.

The latch mechanism allows subframes 14, 16, 18, 20, and 22 to each be selectively removed from base frame 12 without substantial damage to either part. In order to release the latching mechanism to remove subframe 22 from base frame 12, projections 24 on first end 22A and second end 22A of subframe 22 may be pressed inward, towards the center of subframe 22, thereby releasing each projection 24 from its respective recess 26, and at nearly the same time, subframe may be lifted from base frame 12.

Any other suitable means or mechanism for attaching subframes 14, 16, 18, 20, and 22 to base frame 12 may also be used. For example, an adhesive or another type of mechanical "mating" system may be used. In an exemplary embodiment, the attaching means or mechanism chosen allows each subframe 14, 16, 18, 20, and 22 to be removed from base frame 12. In another exemplary embodiment, the attaching means or mechanism chosen does not substantially damage base frame 12 when subframe 14, 16, 18, 20, and/or 22 is removed from base frame 12, so that a replacement subframe may be placed where the removed subframe was attached to base frame 12. In another exemplary embodiment, the attaching means or mechanism chosen does not substantially damage the subframe upon removal so it may be reattached. The latching mechanism in the exemplary embodiment allows for both a relative release of subframe 22 from base frame 12 with little to no damage to base frame 12.

Subframe 22 further includes ribs 27A and 27B. Ribs 27A and 27B are used interlock subframe 22 with base frame 12, and to position subframe 22 with respect to base frame 12. Specifically, each rib 27A and 27B mates with their respective grooves 29 in base frame 12 so that the direction subframe 22 attaches to base frame 12 within the first position (and the second position) is predetermined and preset. In the first position, the end of rib 27A near the first end 22A of subframe 22 fits within groove 29A (shown in FIG. 2A) on first sidewall 12A of base frame 12; the end of rib 27A near the second end 22B of subframe 22 fits within groove 29B on second sidewall 12B of base frame 12; and the end of rib 27B near the second end 22B of subframe 22 fits within groove 29C on second sidewall 12B.

In an exemplary embodiment ribs 27A and 27B are different lengths. Rib 27A is longer than rib 27B, where the length is measured along the same direction as length L of subframe 22, so that rib 27A mates with grooves on both first and second sidewalls 12A and 12B, respectively, while rib 27B mates with grooves only on second sidewall 12B. The different length ribs 27A and 27B makes it difficult for subframe 22 to fit within base frame 12 in a direction opposite to that shown in FIGS. 1 and 3A, where first end 22A of subframe 22 is adjacent first sidewall 12A. There is only one groove 29A on first sidewall 12A that corresponds to rib 27A. If subframe 22 was rotated 180 degrees, rib 27B would not have a groove to mate with on first sidewall 12A.

Base frame 12 further includes a plurality of grooves 29 arranged about the inner perimeter of base frame 12 so that ribs 27 of each subframe 14, 16, 18, 20, and 22 may mate with their respective grooves. Grooves 29 for each subframe 14, 16, 18 20, and 22 are arranged similarly to grooves 29A, 29B, and 29C so that within a subframe position, each subframe 14, 16, 18, 20, and 22 fits within base frame 12 in the same direction (i.e., so that first end 14A, 16A, 18A, 20A, and 22A are all adjacent the same sidewall 12A, 12B, 12C, or 12D). Ribs 27 and grooves 29 also help to ensure that, within the first position, the connector blocks attached to each subframe 14, 16, 18, 20, and 22 are arranged in the same direction. Subframes 14, 16, 18, 20, and 22 and their respective connector blocks may be configured so that the connector block can only fit onto its respective subframe in one direction.

In some embodiments, it may be beneficial to have subframes 14, 16, 18, 20, and 22 attached to base frame 12 in the same direction because there may also be the most clearance between connector blocks when subframes 14, 16, 18, 20, and 22 are attached to base frame 12 in the same direction. The clearance between the connector blocks may facilitate access to the housings of the connector blocks.

Of course, in alternate embodiments, subframes 14, 16, 18, 20, and 22 may be configured to attach to base frame 12 in either direction. For example, first end 14A of subframe 14 may be adjacent first sidewall 12A, while first end 16A of subframe 16 may be adjacent first sidewall 12A.

Subframe 22 includes arms 28, which extend from subframe 22 and are preferably integral with subframe 22. A connector block may be attached to subframe 22 using arms 28. Arms 28 mechanically engage with a slot (e.g., slot 42A in FIG. 3B) in a connector block (e.g., connector block 42 in FIG. 3B), thereby attaching the connector block to subframe 22. The mechanical engagement between arms 28 and the connector block may be permanent, or in an alternate embodiment, the connector block may be removed from arms 28 without substantial damage to subframe 22 or connector block 42. Arms 28 and the respective slots of the connector block may be configured so that the connector block attaches to subframe 22 in only one direction. Each subframe 14, 16, 18, 20, and 22 includes similar arms 28, so that each subframe 14, 16, 18, 20, and 22 is configured to receive a connector block. The present invention also contemplates any other suitable means of configuring each subframe 14, 16, 18, 20, and 22 to receive a connector block. For example, another mechanically engaging mechanism may be used, or the connector block and subframe may be adhered together using an adhesive.

Base frame 12 includes tabs 30, which extend from first sidewall 12A, and tabs 32, which extend from second sidewall 12B. Each subframe 14, 16, 18, 20, and 22 of frame assembly 10 is capable of receiving at least one electrical connector. A plurality of conductors may be connected to each electrical connector. Tabs 30 and 32 may be used to manage the plurality of conductors that may be attached to the plurality of connector blocks that are attached to frame assembly 10 (by subframes 14, 16, 18, 20, and 22). One end of a conductor is typically connected to a connector block; thereafter, the conductor may be routed through an opening (i.e., openings 40 in FIG. 2B) created between adjacent tabs 30 and first sidewall 12A and between adjacent tabs 32 and second sidewall 12B, thus separating the plurality of conductors, which may be connected to the connector blocks that are attached to the frame assembly, into groups. Labels may be placed on each one of tabs 30 and 32 to identify the conductors that are being fed through each corresponding opening. If a telecommunications worker needs to disconnect a conductor from a connector block, tabs 30 and 32 may allow the worker to easily identify the location of the conductor. Furthermore, the openings (i.e., openings 40 in FIG. 2B) may help to prevent the conductors from becoming tangled.

Figure 2A:
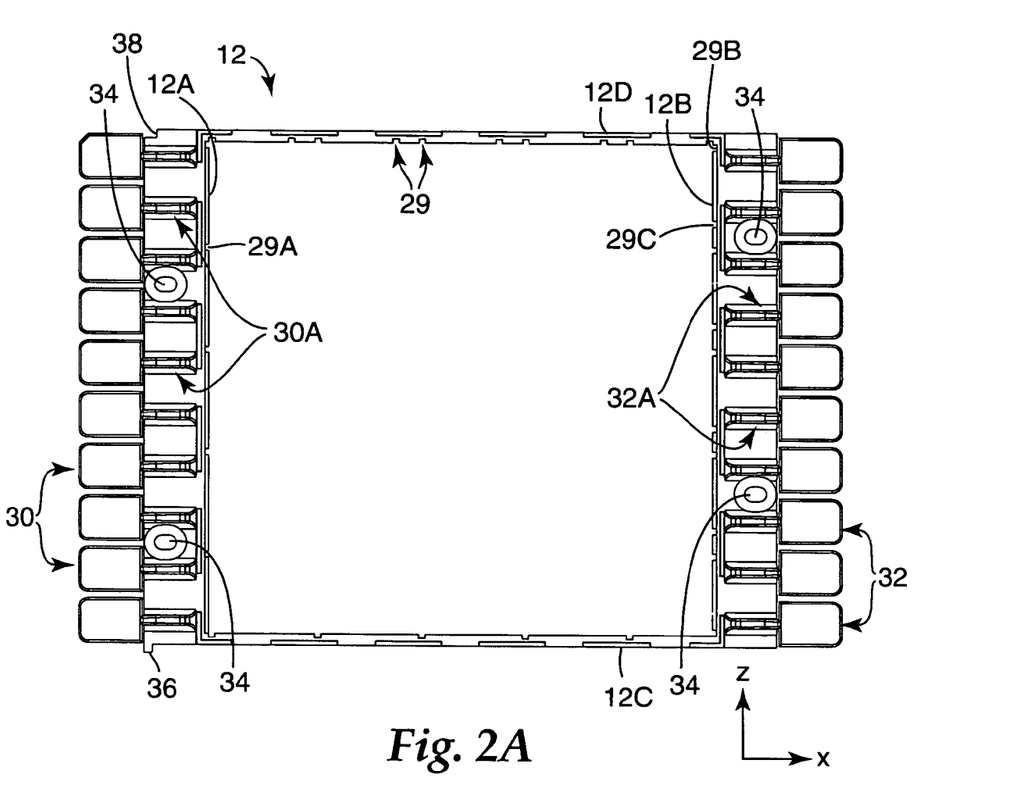
FIG. 2A is a top view of the base frame of FIG. 1, showing how the edges of the base frame may include a notch and/or an intedentation, so that the base frame may interconnect with adjacent base frames.

FIG. 2A is a top view of base frame 12 of FIG. 1, and illustrates how tabs 30 and 32 may extend from base frame 12. Tabs 30 extend from first sidewall 12A by way of arms 30A, and tabs 32 extend from second sidewall 12B by way of arms 32A. FIG. 2A also shows screw holes 34. A screw (or other suitable mechanism) may be inserted in each screw hole 34 to mount base frame 12 in the central location.

Base frame 12 is typically mounted on a generally vertical surface so first and second sidewalls 12A and 12B extend in a generally vertical direction (e.g., in a z-coordinate direction, where orthogonal x-z coordinates are shown in FIG. 2A, and where a y-coordinate direction runs perpendicular to the plane of the image), and third and fourth sidewalls 12C and 12D extend in a generally horizontal direction (e.g., in a x-coordinate direction). Further, when base frame 12 is mounted in the central location, tabs 30 and 32 are preferably aligned in the generally vertical direction so that tabs 30 does not share x-coordinates with tabs 32, and so that each one of tabs 30 have the same x-coordinate, and each one of tabs 32 have the same x-coordinate.

Also shown in FIG. 2A is notch 36 and indentation 38 on base frame 12. Notch 36 is formed so that it may interconnect with a indentation of an adjacent base frame (which may also be mounted in the central location), where the indentation has generally the same shape as indentation 38. Indentation 38 is formed so that it may interconnect with a notch of an adjacent base frame, where the notch has generally the same shape as notch 36. When base frame 12 is mounted in the central location with a plurality of other base frames, notch 36 and indentation 38 allow base frame 12 to fit together with adjacent base frames.

Figure 2B:
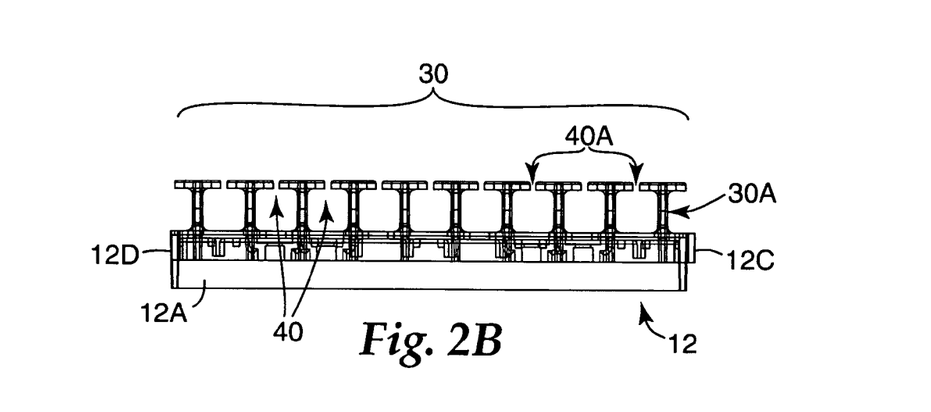
FIG. 2B is a front view of an exemplary embodiment of a base frame of FIG. 1, where tabs that extend from a first sidewall of the base frame, together with the first sidewall, form openings for receiving conductors.

FIG. 2B is a side view of base frame 12, and shows how tabs 30, together with first sidewall 12A, form a plurality of openings 40 for receiving one or more conductors that are connected to a connector block that is mounted on frame assembly 10. Arms 30A are somewhat flexible so that a conductor may be introduced through gap 40A between tabs 30 in order to reach the respective opening 40. However, arms 30A should also be somewhat rigid so that when the conductor is introduced through gap 40A, the conductor does not incidentally exit its respective opening 40. A telecommunications worker who wishes to remove the conductor from its respective opening may do so, though, because of the somewhat flexible arms 30A. Although it is not seen in the view shown in FIG. 2, tabs 32, which extend from second sidewall 12B, also form a plurality of openings for receiving a conductor. Tabs 32 and their respective openings are "behind" tabs 30 and openings 40 in the plane of the image of FIG. 2B.

FIG. 3A is a perspective view of frame assembly 10 of FIG. 1 as assembled. Subframes 14, 16, 18, 20, and 22 are attached (or "mounted") to base frame 12 so that they are generally parallel to each other, and so that subframe 14 is positioned between subframe 16 and third sidewall 12C of base frame 12, subframe 16 is positioned between subframes 14 and 18, subframe 18 is positioned between subframes 16 and 20, subframe 20 is positioned between subframes 18 and 22, and subframe 22 is positioned between subframe 18 and fourth sidewall 12D (not shown in FIG. 3). When a connector block is attached to each subframe 14, 16, 18, 20, and 22, and the subframes are attached to base frame 12 as shown in FIG. 3, the connector blocks are also generally parallel to each other and adjacent one another. Because of this close arrangement of connector blocks, the cable management features of tabs 30 and 32 may be beneficial. If each connector block is capable of receiving twenty conductors, and there are five connector blocks on frame assembly 10, up to 100 conductors would be in a small amount of space at a time. Tabs 30 and 32 may be used to arrange the conductors in an organized fashion.

The number of connector blocks that may be mounted on a frame assembly of the present invention varies depending on many factors, including the dimensional parameters of the central location in which the frame assembly is expected to be mounted (which in turn, may depend on the needs of the particular telecommunications network the central location serves to connect).

FIG. 3B is the assembled perspective view of frame assembly 10, where a connector block 42 is attached to subframe 22. Arms 28 of subframe 22 extend through slot 42A on opposite ends of connector block 42 and mechanically engage therewith. In this way, connector block 42 is attached to subframe 22, and thereby attached to base frame 12. As previously stated, in alternate embodiments of the present invention, an alternate method of attaching subframe 22 and connector block 42 may be used. Furthermore, the attachment may be permanent or semi-permanent (where connector block 42 may be removed from subframe 22 if necessary, but is still securely attached to subframe 22).

The depiction of connector block 42 in FIG. 3B is for clarity of illustration and is merely used as an aid to describe the present invention. The present invention may be used with any suitable type of connector blocks, not only a connector block that resembles connector block 42 shown in FIG. 3B. Examples of suitable connector blocks that may be used in accordance with the present invention are described in U.S. patent application Ser. No. 10/941,506, entitled, "INSULATION-DISPLACEMENT SYSTEM FOR TWO ELECTRICAL CONNECTORS", and filed on Sep. 15, 2004, and U.S. patent application Ser. No. 10/941,441, entitled, "CONNECTOR ASSEMBLY FOR HOUSING INSULATION DISPLACEMENT ELEMENTS", and filed on Sep. 15, 2004.

FIG. 4 is an exploded perspective view of frame assembly 11, which is frame assembly 10 of FIG. 2, where subframes 14, 16, 18, 20, and 22 are positioned to attach to base frame 12 in the second position. In the second position, first end 14A of subframe 14 is adjacent third sidewall 12C of base frame 12, and second end 14B of subframe is adjacent fourth sidewall 12D of base frame 12; first end 16A of subframe 16 is adjacent third sidewall 12C of base frame 12, and second end 16B of subframe 16 is adjacent fourth sidewall 12D of base frame 12, and so forth with respect to subframes 18, 20, and 22.

In the second position, the end of rib 27A near the first end 22A of subframe 22 mates with groove 29D on third sidewall 12C, and the end of rib 27A near the second end 22B of subframe 22 mates with groove 29E on fourth sidewall 12D. The end of rib 27B near the second end 22B of subframe 22 mates with grooves 29F on fourth sidewall 12D. Ribs 27 of each subframes 14, 16, 18, and 22 similarly fit within grooves 29 along third sidewall 12C and fourth sidewall 12D. Ribs 27 and grooves 29 help to ensure that within the second position, each subframe 14, 16, 18, 20, and 22 fits within base frame 12 in the same direction (i.e., so that first end 14A, 16A, 18A, 20A, and 22A are all adjacent third sidewall 12C).

Frame assembly 11 may be mounted in a central location in the same way as frame assembly 10, so that first and second sidewalls 12A and 12B of base frame 12 extend in a generally vertical direction, while third and fourth sidewalls 12C and 12D extend in a generally horizontal direction. As a result of subframes 14, 16, 18, 20, and 22 each being in its second position, the connector block that is attached to each subframe 14, 16, 18, 20, and 22 is mounted in the central location in a generally "vertical" position. Each connector block typically includes a plurality of housings, and in the second position, those housings are in a vertically stacked orientation. If a connector block has a greater dimension in its length than width, the connector block may be described as being mounted in the second position so that its lengths are each elongated in the vertical direction.

Tabs 30 and 32 of base frame 12 may also be used for cable management purposes with frame assembly 11.

In an exemplary embodiment of the present invention, subframes 14, 16, 18, 20, and 22 each attach to base frame 12 using a latching mechanism (described above). Because base frame 12 includes a plurality of recesses 26 arranged about all four sidewalls 12A, 12B, 12C, and 12D (along the inner perimeter of base frame 12), subframes 14, 16, 18, 20, and 22 may be attached to base frame 12 in either the first position (frame assembly 10 of FIGS. 1 and 3) or the second position (frame assembly 11 of FIGS. 4 and 5). A telecommunications worker may move subframes 14, 16, 18, 20, and 22 between the first position and the second position in the field. Specifically, subframes 14, 16, 18, 20, and 22 may be detached from base frame 12 and reattached to base frame 12 in another position.

FIG. 5 is an assembled perspective view of frame assembly 11 of FIG. 4, where subframes 14, 16, 18, 20, and 22 are each attached to base frame 12 in the second position. As previously stated, in the second position, each subframe 14, 16, 18, 20, and 22 is attached to base frame 12 so that it generally perpendicular to its positioning in the first position. Subframes 14, 16, 18, 20, and 22 are attached (or "mounted") to base frame 12 so that they are generally parallel to each other, and so that subframe 14 is positioned between subframe 16 and first sidewall 12A of base frame 12, subframe 16 is positioned between subframes 14 and 18, subframe 18 is positioned between subframes 16 and 20, subframe 20 is positioned between subframes 18 and 22, and subframe 22 is positioned between subframe 18 and second sidewall 12B (not shown in FIG. 5).

Materials for the frame and subframe may be selected to provide desirable characteristics such as strength durability, resilience, cost, and ease of manufacture. Exemplary materials include acetal, polybutylene terephthalate, polyester, polyamide, polyetherketone, and metals such as aluminum and steel. These may be injection molded or stamped and formed as appropriate for the selected material.

While a "horizontally" mounted connector block (i.e., the first position of frame assembly 10) is the conventional way of mounting a connector block at the time the present application is filed, there are advantages to "vertically" mounted connector blocks (i.e., the second position of frame assembly 11). These advantages are described in U.S. patent application Ser. No. 11/131,639entitled, "ELECTRICAL CONNECTOR ASSEMBLY AND METHOD OF FORMING THE SAME," and filed on the same date as the present application. A frame assembly in accordance with the present invention may be mounted in a central location so that the subframes are in a first position, and connector blocks are "horizontally" mounted. However, the subframes may later be arranged to be in a second position, in order for the connector blocks to be "vertically"mounted. This later arrangement may be made in the field. The present invention is versatile because of the modularity of the subframes and adaptability of the frame assembly to different subframe (and therefore, connector block) positions.

Although the present invention is only described with respect to the telecommunications industry, other applications of a frame assembly in accordance with the present invention are contemplated. Likewise, although the present invention has been described with reference to preferred embodiments, workers skilled in the art will recognize that changes may be made in form and detail without departing from the spirit and scope of the invention.

The invention claimed is:

1. A frame assembly for mounting an insulation displacement connector block, the frame assembly comprising:
    a first base frame including a first sidewall, a second sidewall, a third sidewall, and a fourth sidewall, wherein the first sidewall and the second sidewall are generally parallel, and the third sidewall and the fourth sidewall are generally parallel;
    a first subframe for receiving the insulation displacement connector block, wherein the first subframe is attached to the first base frame in a first position disposed between the first sidewall and the second sidewall, and wherein the first subframe is subsequently reattached to the base frame in a second position disposed between the third sidewall and the fourth sidewall of the base frame, wherein the first position and the second position are generally perpendicular to each other, and a second subframe for receiving the insulation displacement connector block, wherein the second subframe is attached to the first base frame in a similar position as the first subframe.

2. The frame assembly of claim 1, wherein the first subframe has a first end and a second end opposite the first end, wherein in the first position, the first end of the first subframe is adjacent to the first sidewall of the first base frame and the second end of the first subframe is adjacent to the second sidewall of the first base frame, and wherein in the second position, the first end of the first subframe is adjacent to the third sidewall of the first base frame and the second end of the first subframe is adjacent to the fourth sidewall of the first base frame.

3. The frame assembly of claim 2, and farther including a first tab extending away from the first sidewall of the first base frame and a second tab extending away from the second sidewall of the first base frame.

4. The frame assembly of claim 3, and further comprising a third tab adjacent the first tab, wherein the first and third tab, together with the first sidewall, form an opening for receiving a conductor.

5. The frame assembly of claim 1, wherein the first subframe is detachable from the first base frame.

6. The frame assembly of claim 5, wherein the first subframe is reattachable to the first base frame.

7. The frame assembly of claim 1, wherein the first subframe is attached to the first base frame using a latching mechanism.

8. The frame assembly of claim 1, wherein at least part of a perimeter of the first base frame is shaped to interconnect with an adjacent second base frame.

9. The frame assembly of claim 1, wherein the first base frame and subframe are each formed of polybutylene terephthalate.

10. The frame assembly of claim 1, wherein within the first and second positions, the first subframe is configured to attach to the base frame in a predetermined direction.

11. frame assembly comprising:
a base frame including a generally planar sidewall;
a first modular subframe attached to the base frame and including a first longitudinal edge, wherein the first modular subframe for receiving an insulation displacement connector block, and wherein the first subframe is attachable to the base frame in a first position and subsequently reattachable to the base frame in a second position different from the first position in which it was attached, wherein in the first position, the first longitudinal edge is generally parallel to the sidewall of the base frame, and in the second position, the first longitudinal edge is generally perpendicular to the sidewall of the base frame; and a second modular subframe attached to the base frame, wherein the second modular subframe includes a second longitudinal edge, and wherein the second longitudinal edge of the second modular subframe is generally parallel to the first longitudinal edge of the first modular subframe.

12. The frame assembly of claim 11, wherein the first subframe is detachable from the base frame.

13. The frame assembly of claim 11, wherein the first subframe is attached to the base frame using a latching mechanism.

14. The frame assembly of claim 11, and further including a pair of tabs extending away from the sidewall of the base frame, wherein the pair of tabs, together with the sidewall, form an opening for receiving a conductor.

15. The frame assembly of claim 11, wherein within the first and second positions, the first modular subframe is configured to attach to the base frame in a predetermined direction.

* * * * *

UNITED STATES PATENT AND TRADEMARK OFFICE
CERTIFICATE OF CORRECTION

PATENT NO. : 7,303,446 B2  Page 1 of 1
APPLICATION NO. : 11/131874
DATED : December 4, 2007
INVENTOR(S) : Douglas P. Hills It is certified that error appears in the above-identified patent and that said Letters Patent is hereby corrected as shown below:

Column 10,
Line 20, delete "11/131,639entitled" and insert in place thereof -- 11/131,639 entitled --.
Line 28, delete ""vertically"mounted" and insert in place thereof -- "vertically" mounted --.
Line 57, delete "," and insert in place thereof -- ; --.

Column 11,
Line 29, before "frame" insert -- A --.

Signed and Sealed this

Eighth Day of July, 2008

JON W. DUDAS
*Director of the United States Patent and Trademark Office*